UNITED STATES PATENT OFFICE.

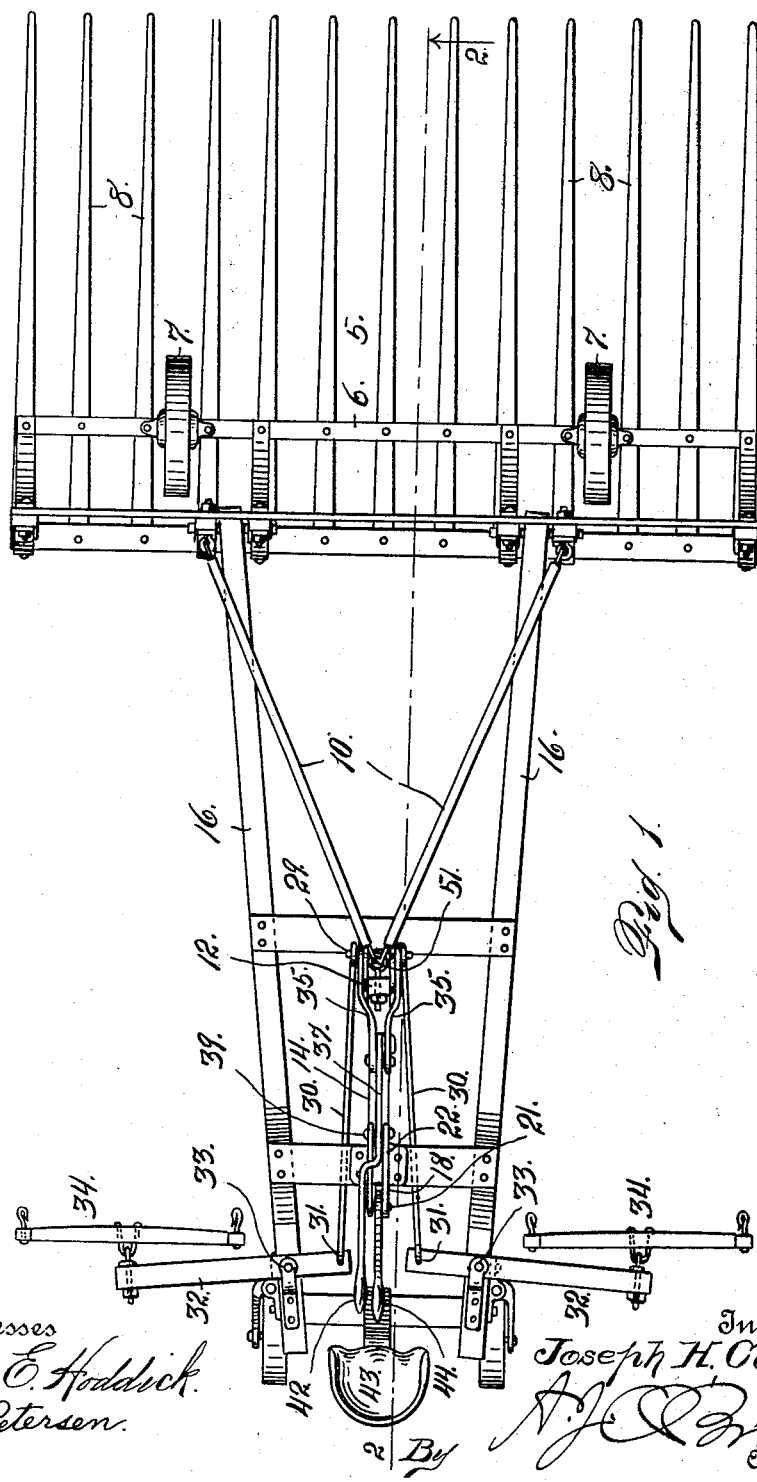

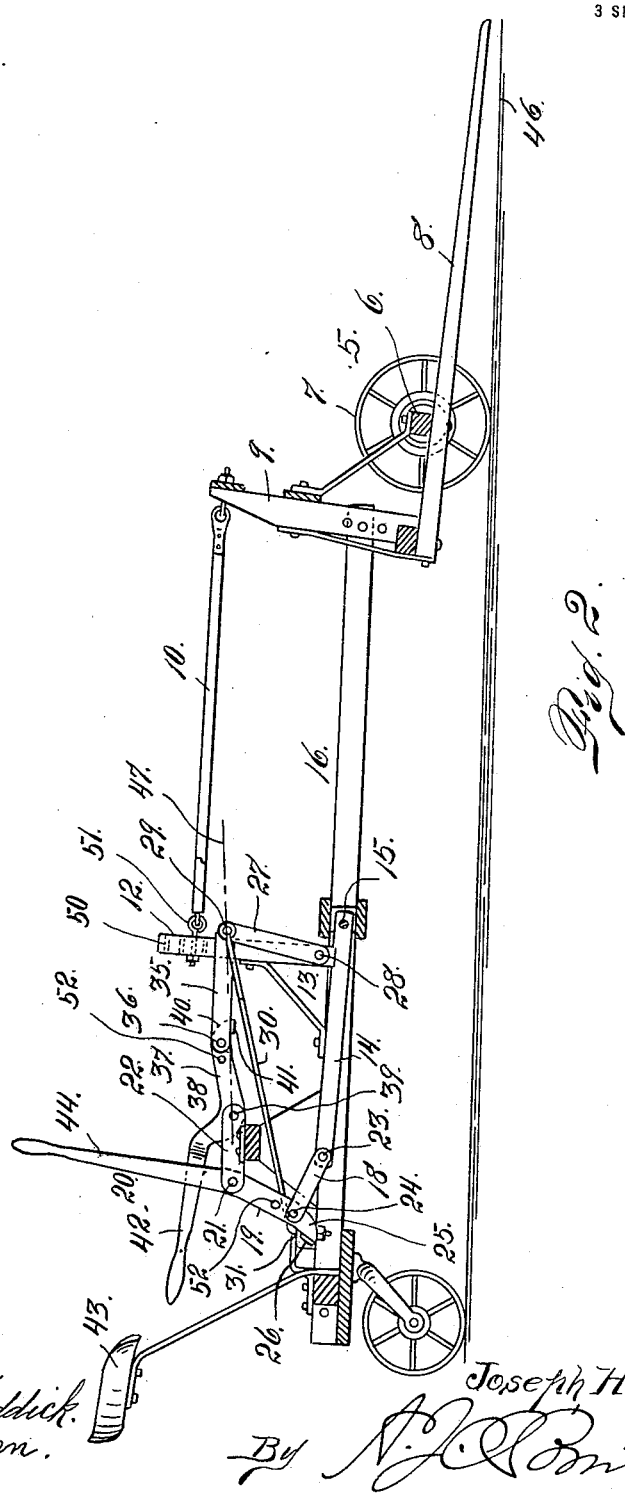

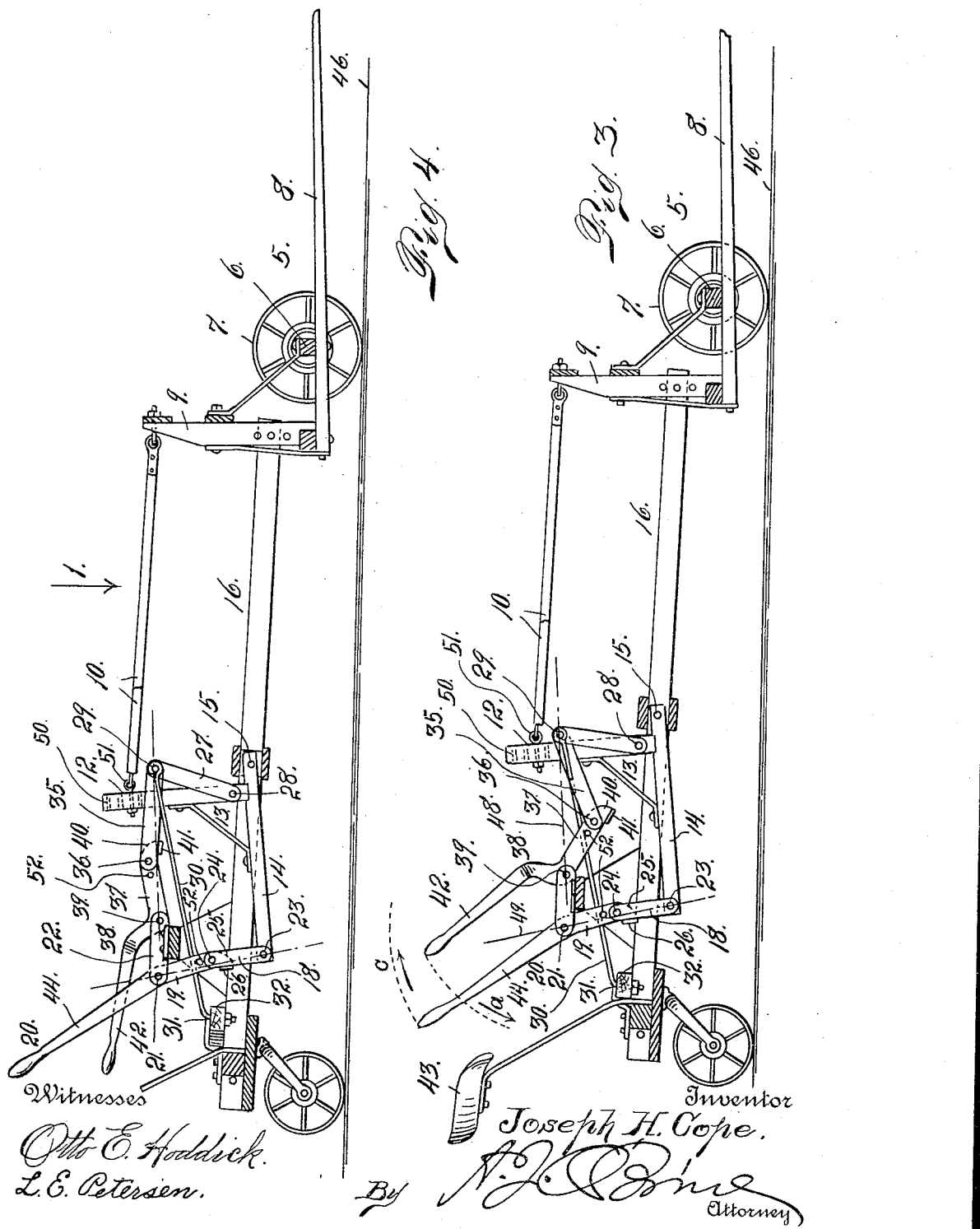

JOSEPH H. COPE, OF WINDSOR, COLORADO, ASSIGNOR TO THE WINDSOR MANUFACTURING COMPANY, OF WINDSOR, COLORADO, A CORPORATION OF COLORADO.

SWEEP-RAKE.

1,205,973.

Specification of Letters Patent.

Patented Nov. 28, 1916.

Application filed August 25, 1913. Serial No. 786,360.

*To all whom it may concern:*

Be it known that I, JOSEPH H. COPE, a citizen of the United States, residing at Windsor, county of Weld, and State of Colorado, have invented certain new and useful Improvements in Sweep-Rakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in sweep rakes or rakes more commonly used in raking hay, the horses being so hitched to the implement that the head of the rake upon which the material is collected is pushed ahead of the draft animals. In constructions of this kind, it is desirable to so construct the apparatus that after a load of hay or other material is gathered upon the teeth of the rake head, the power of the horses is utilized to lift or raise the teeth of the head above the gathering position in order to better retain the hay upon the head during the travel of the implement to the stack or other location where the unloading is accomplished. In constructions of this character, that is to say, where the power of the draft animals is employed to actuate the head of the rake to raise the teeth above the ground, it is important that during the hay gathering operation the mechanism be so arranged that the rake head may rise and fall to conform to the unevenness of the surface of the ground over which the machine is traveling, without interference from the draft mechanism of the machine. Heretofore, so far as I am aware, the draft appliances or connections to permit the power of the draft animals to act to raise the rake head, are fixedly connected with the head.

The object of my present invention is to overcome this difficulty and to this end, the draft appliances in my improved machine, are not fixedly connected with the rake head, either directly or indirectly, thus making it practicable for the rake head to vibrate vertically within the limits required over the uneven surface of the ground, without any interference whatever from the draft connections through whose instrumentality the rake head is raised by the power of the draft animals when required. Again, by virtue of the fact that the draft appliances are non-fixedly connected with the rake head, it becomes necessary to completely lock the draft connections out of commission so far as any influence on the rake head is concerned, during which time the head may be raised by hand with the same facility as would be the case in the absence of draft connections for operating the head. This idea is, however, illustrated in the drawing of my previous application, entitled Improvements in power lift sweep rakes, Serial No. 627,990, filed May 18, 1911, but no claims in said application were drawn to cover this feature, since it was considered a separate invention. The construction of my present improvement for performing the aforesaid function while different from that shown in the said application, is nevertheless adapted to perform the same function, the mechanism being simplified as compared with that disclosed in said application.

In this drawing: Figure 1 is a top plan view of a sweep rake equipped with my improvement. This is a view looking in the direction of arrow 1, Fig. 4. Fig. 2 is a section taken on line 2—2, Fig. 1, the mechanism however, being shown in a different position. Fig. 3 is a section taken on the same line with the parts in still another position. Fig. 4 is a section taken on the same line with the parts in a different position from that shown in either of Figs. 2 and 3.

The same reference characters indicate the same parts in all the views.

Let the numeral 5 designate the rake head which is mounted on an axle 6 supported by ground wheels 7, the axle being located near the rear part of the head, whereby the teeth 8 extend forwardly much farther beyond the axle than they extend rearwardly beyond the same. The head of the rake is arranged to rock or tilt upon the ground wheels 7 as a fulcrum. In the rear of the axle, the head is provided with rigidly secured upright bars 9 which are connected by means of rods 10 with the upright arm 12 of a bell crank lever construction 13, composed of the arm 12 and a rearwardly extending arm 14, the bell crank lever being pivoted as shown at 15 on the main framework 16 of the implement. The rear extremity of the arm 14 is connected by means of a link 18 with one arm 19 of a lever 20 fulcrumed at 21 upon a stationary member 22. The link 18 is composed of two parts whose forward extremities are pivotally connected as shown at 23 with the bell crank lever arm 14 while their rear extremities are connected as shown at 24 with the arm 19 of the lever 20, the said lever arm having an extension 25 below the pivot 24, the said extension carrying a part 26 adapted to engage the link 18 when the lever 20 is properly adjusted, this position being illustrated in Figs. 2, 3 and 4. Two links 27 are arranged on opposite sides of the bell crank lever arm 12, the lower extremities of the links being pivotally connected with the said lever arm as shown at 28. The upper extremities of the two links 27 are connected with each other by means of a pin 29 which is located forward of the arm 12. The opposite extremities of this pin 29 are pivotally connected with the forward extremities of two rods 30 whose rear extremities are movably connected at 31 with the inner ends of evener members 32 which are pivoted on the frame as shown at 33. The outer extremities of these evener members support the whiffle trees 34 to which the draft animals for moving the machine are hitched. Two links 35 are also arranged on opposite sides of the bell crank lever arm 12 and their forward extremities are also pivotally connected with the pin 29, while their rear extremities are pivotally connected as shown at 36 with the arm 37 of a lever 38 fulcrumed at 39 upon the stationary part 22 of the machine. The arm 37 of the lever 38 is provided with a short forward extension 40 having a projection 41 adapted to engage one or both links 35 when the lever 38 is thrown to the position to lock the rake head from being lifted by the pull of the draft animals. The lever 38 has a relatively long arm 42 which is conveniently accessible to the man in charge of the machine when occupying the seat 43. The lever 20 has a relatively long arm 44 which is also arranged conveniently for hand manipulation by the operator.

From the foregoing description, the operation of my improved mechanism will be readily understood. In Fig. 2 the relative positions of the various parts of the mechanism when the machine is in use for the hay gathering purpose are disclosed. That is to say, the rake head is tilted forwardly or so that the teeth of the head slope downwardly from their rear extremities, the forward extremities of the teeth being quite close to the surface 46. Furthermore, the lever 38 is so adjusted that the arm 37 of the lever and the links 35 are arranged to lock the draft appliances out of commission so far as any action or influence on the rake head is concerned. This locking function is accomplished by reason of the fact that a line 47 drawn through the fulcrum 39 of the lever and the pin 29 occupies a position below the pivot 36 which connects the lever arm 37 with the links 35. Hence, a rearward strain on the rods 30 due to the forward pull of the draft animals on the outer extermities of the evener members 32, cannot move the pin 29 rearwardly, and consequently the said pin cannot act upon the arm 12 of the bell crank lever 13 to impart the necessary rearward movement thereto to operate the rake head to raise the forward portions of the rake head teeth. However, as soon as the load of hay is gathered upon the teeth of the head, if it is desired to operate the head through the agency of the draft appliances, to raise the load above the ground, the operator will lift the arm 42 of the lever 38 whereby the toggle joint formed by the lever arm 37 and the links 35 will assume the position illustrated in Fig. 3, causing the pin 36 to occupy a position considerably below a line 48 passing through the fulcrum 39 and the pin 29. As soon as this occurs, the pull of the draft animals is free, through the medium of the rods 30, the evener members 32, the pin 29, the upright arm 12 of the bell crank lever, and the rods 10, to rock the rake head on the ground wheels, whereby the head is caused to assume the position best illustrated in Figs. 3 and 4. As the bell crank lever 13 is actuated to perform the function just explained, the arm 14 of the said lever is tilted downwardly to the position of the lever 20 and the link 18 is changed in the first instance to throw the fulcrum 21 and the pivot pins 24 and 23 into the straight line position. The operator or man in charge of the machine, will then move the arm 44 of the lever 20 slightly rearwardly or in the direction of the arrow *a* (Fig. 4), whereby the pivot pin 24 will be thrown slightly forward of a line 49 passing through the fulcrum 21 and the pivot 23, whereby the stop 26 will be caused to engage the link 18 and lock the lever 20 against further movement. Furthermore, this position of the lever 20 of the link 18, will lock the rake head in the raised position shown in Figs. 3 and 4, since the bell crank lever arm 14 cannot move upwardly. Then to prevent any further strain upon the bell crank lever and its connections, the lever 38 of the links 35 may be thrown manually to the locking position disclosed in Figs. 2 and 4, whereby the pin 29 is maintained forward and free from the upright arm 12 of the bell crank lever; hence, the pull of the draft animals has no further influence upon the said lever. Now, as soon as the load of hay is removed from the rake head and it is desired to return the head to the position shown in Fig. 2, the lever arm 44 will be moved in the direction of the arrow c whereby the said lever and the link 18 are caused to occupy the position shown in Fig. 2, after which the rake head will assume the hay gathering position.

From the foregoing, it will be understood that during the hay gathering operation, the rake head may rise and fall to conform to the unevenness of the surface over which the machine is traveling, without any interference whatever from the draft appliances. Again, if it is desired to raise the rake head by hand without the interposition of the draft appliances, it will be understood that in order to do so, it will only be necessary for the operator, assuming that the parts are in the position shown in Fig. 2, to operate the lever 20, and move the arm 44 in the direction of the arrow a, Fig. 3, in which event, the rake head will be raised and the parts of the structure will be in the position shown in Fig. 4. The rake head may then be lowered in the same manner as heretofore explained when it is lifted through the agency of the draft appliances, namely, by moving the arm 44 of the lever 20 in the direction of the arrow c, Fig. 3, when the parts will again assume the position shown in Fig. 2.

Attention is called to the fact that the pin 29 which connects the parts 35 which form the link connection between the lever 38 and the links 27, may consist of any suitable device adapted to bear against the upright arm 12 of the bell crank lever. When the rake head is in the lowered position, this pin should occupy a position somewhat forward of the normal position of the upright arm 12, in order that the rake head may have the desired or necessary range of vertical vibration to conform to the unevenness of the ground surface, without interference in any way, from the draft appliances, including the rods 30, the pin 29 and the evener members 32. This is a very important feature of my improved construction and is due to the fact that the pin 29 is non-fixedly connected with the upright arm 12 of the lever and therefore free to move away from said lever in a forward direction as best illustrated in Fig. 4. It should also be explained that the upright arm 12 of the lever is provided with a number of perforations 50 adapted to receive the eye bolt 51 which forms the connection between the rods 10 and the upright bars 9 of the rake head. By adjusting this eye bolt, the tilting movement imparted to the rake head for a given movement of the upright arm 12 of the bell crank lever may be varied at will. The lever arms 37 and 19 of the levers 38 and 20 may be provided with one or more perforations 52 for purposes of adjustment, and to permit the changing of the pivot pins 36 and 24 at will or whenever occasion may require.

Having thus described my invention, what I claim is:

1. In a sweep rake, the combination with a frame and a head tiltably mounted thereon, of a bell crank lever fulcrumed on the frame, an operative connection between the head and one arm of said lever, power lift devices connected with the said arm of the lever, hand lift devices connected with the other arm of the lever, means for locking the power lift devices against operating the head, said locking means including a manually operable lever, and a link connected therewith to form a toggle, said lever provided with an extension adapted to engage the link.

2. In a sweep rake, the combination with a frame and a head tiltably mounted, of a bell crank lever fulcrumed on the frame, an operative connection between the head and said lever, power lift devices connected with one arm of the lever, hand lift devices connected with the other arm of the lever, means for locking the power lift devices against operating the head, the hand lift devices being operable independently of the power lift devices, and comprising a lever provided with an extension and a link connected with the lever to form a toggle.

3. In a sweep rake, the combination with a power lift, a hand lift, a bell crank lever connected in operative relation with the rake head, a connection between one arm of the lever and the power lift, and a link connecting the other arm of the lever and the hand lift, the latter provided with an extension adapted to engage said link, for the purpose set forth.

4. In a sweep rake, the combination of a power lift, a hand lift, a bell crank lever connected in operative relation with the rake head, a connection between one arm of the lever and the power lift, a connection between the other arm of the lever and the hand lift, the latter provided with an extension adapted to engage said link, and means for locking the power lift in the inactive position.

5. In a sweep rake, the combination with a frame and a head tiltably mounted thereon, of a bell crank lever fulcrumed on the frame, an operative connection between the head and one arm of said lever, links connected with the said arm of the lever, rods attached to said links, eveners for supporting the whiffle trees mounted upon the framework and connected with said rods, and hand lift devices connected with the other arm of the lever.

In testimony whereof I affix my signature in presence of two witnesses.

JOSEPH H. COPE.

Witnesses:
ANNA L. LEHMAN,
A. J. O'BRIEN.

Copies of this patent may be obtained for five cents each, by addressing the "Commissioner of Patents, Washington, D. C."